Sept. 23, 1969 H. C. FISCHER 3,468,022
METHOD OF MAKING RAPID HEAT DISSIPATING ELECTRIC HEATERS
Filed March 15, 1966 3 Sheets-Sheet 1
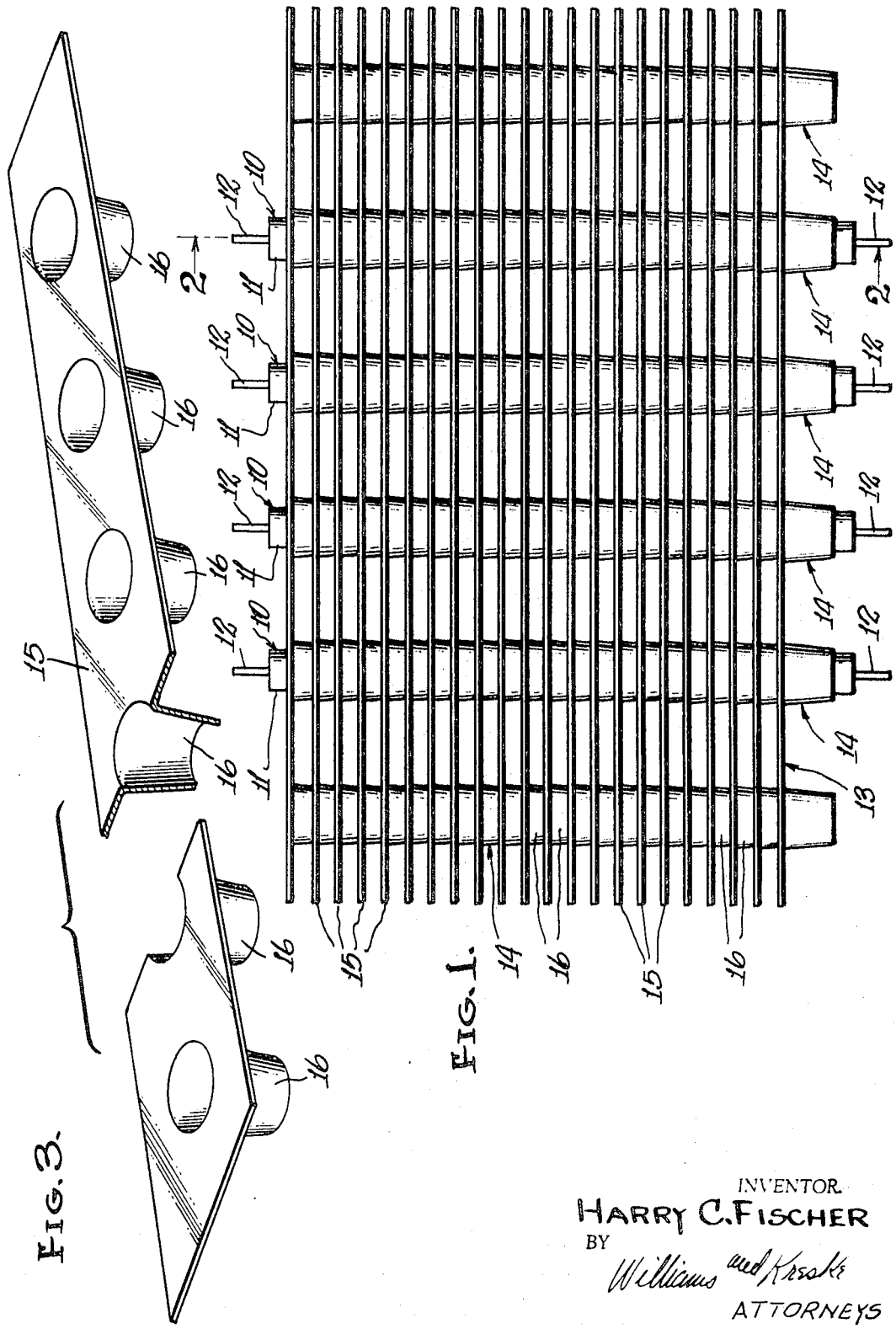
INVENTOR.
HARRY C. FISCHER
BY
Williams and Kresske
ATTORNEYS Sept. 23, 1969　　　　　H. C. FISCHER　　　　　3,468,022
METHOD OF MAKING RAPID HEAT DISSIPATING ELECTRIC HEATERS
Filed March 15, 1966　　　　　　　　　　　　　　3 Sheets-Sheet 2
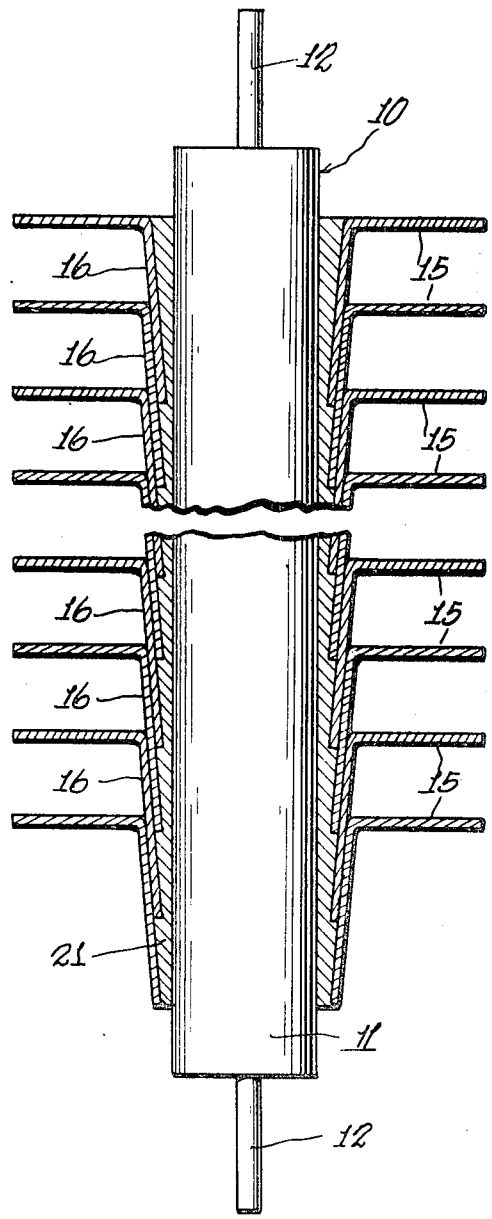
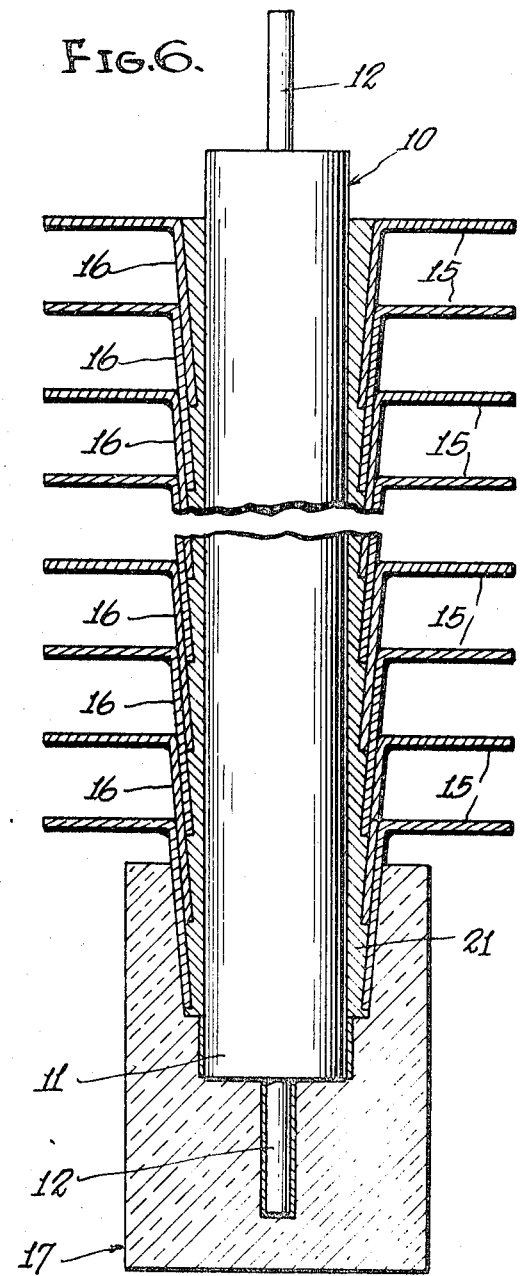
INVENTOR.
HARRY C. FISCHER
BY Williams and Kreske
ATTORNEYS Sept. 23, 1969           H. C. FISCHER          3,468,022
METHOD OF MAKING RAPID HEAT DISSIPATING ELECTRIC HEATERS
Filed March 15, 1966                    3 Sheets-Sheet 3
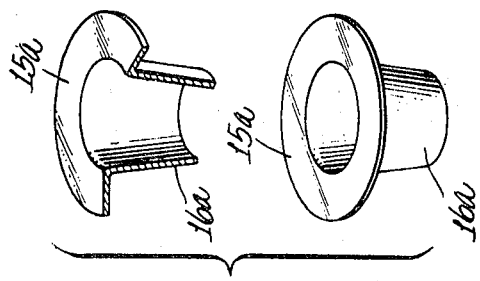
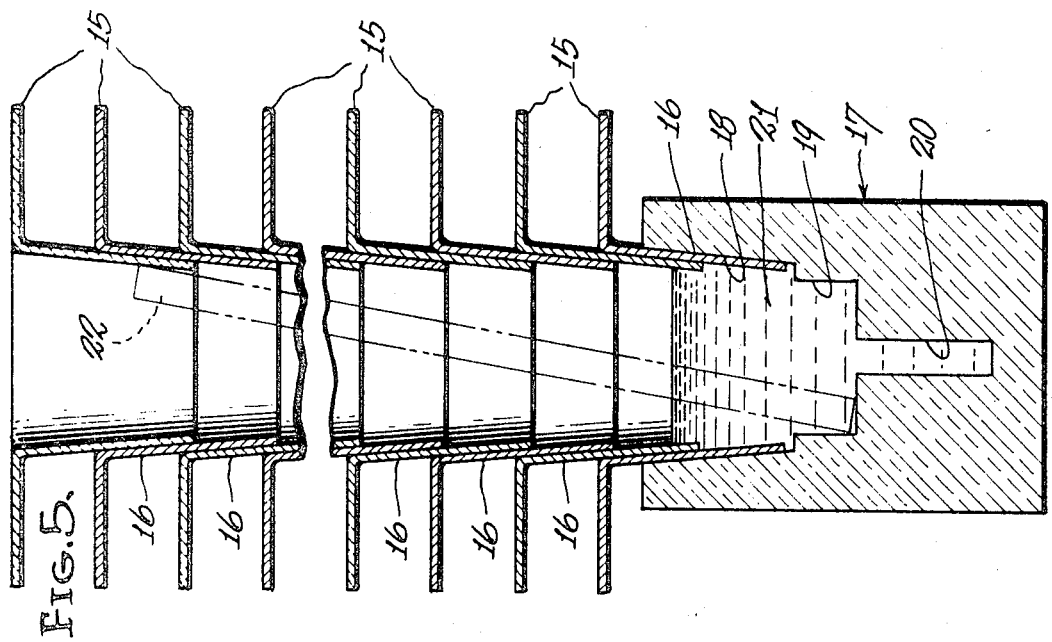
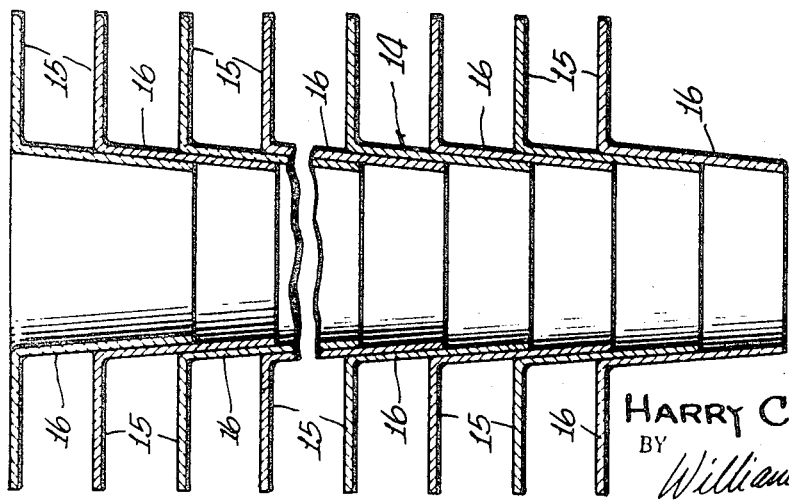
INVENTOR.
HARRY C. FISCHER
BY *Williams and Kreske*
ATTORNEYS

United States Patent Office 3,468,022
Patented Sept. 23, 1969

3,468,022
METHOD OF MAKING RAPID HEAT DISSIPATING ELECTRIC HEATERS
Harry C. Fischer, Royal Oak, Md., assignor to Edwin L. Wiegand Company, Pittsburgh, Pa.
Filed Mar. 15, 1966, Ser. No. 534,486
Int. Cl. B23p 15/26
U.S. Cl. 29—611        8 Claims

ABSTRACT OF THE DISCLOSURE

The method of making a finned electric heating element, and the article produced thereby, by stacking the tapered tubular portions of a plurality of metal fins, one within the next to form an elongated tube, positioning a metal-sheathed tubular heating element within the tube, filling the space between the exterior of the element and the interior of the tube with heat-conducting material in a fluid state, and solidifying such material.

---

The present invention relates to electric heaters, more particularly to electric heaters having high heat dissipating characteristics, and the principal object of the present invention is to provide new and improved heaters and methods of making the same.

Despite the many attempts to improve the heat-dissipating characteristics of sheathed electric heating elements, as by providing heat-conductive fins thereon, none have been completely satisfactory in that manufacturing costs have been high and/or efficiency has been low. Moreover, the most practical from a standpoint of cost and efficiency have not been well-adapted for use in multiple units. The manner in which the present invention overcomes these and other prior art disadvantages will readily become apparent from a study of the following description and from the drawings appended hereto.

In the drawings accompanying this specification and forming a part of this application there is shown, for purpose of illustration, embodiments which the invention may assume, and in these drawings:

FIGURE 1 is a side elevational view of an electric heater assembly made in accordance with the present invention, FIGURE 2 is an enlarged sectional view generally corresponding to the line 2—2 of FIGURE 1, FIGURE 3 is a reduced size, broken perspective view of a detail, FIGURE 4 is a view similar to FIGURE 2 but at an intermediate assembly stage, FIGURES 5 and 6 are views similar to FIGURE 4 but at still other assembly stages, and FIGURE 7 is an exploded, broken perspective view of details of a slightly different embodiment of the invention.

The embodiment of the invention seen in FIGURE 1 comprises a plurality of elongated heating elements 10, herein shown to be four in number in spaced-apart, side-by-side relation. The elements 10 are of the well-known construction wherein a tubular metallic sheath 11 is filled with compacted, electric-insulating, heat-conductive material in which a resistor conductor is embedded. In the usual manner, each resistor conductor terminates short of the ends of its element sheath 10 and is connected to terminal conductor pins 12 which protrude beyond the sheath ends for connection to a source of electrical energy. It is believed the foregoing brief description of the elements 10 will suffice in view of their well-known character.

Still referring to FIGURE 1, elements 10 are carried by a finned body 13 next to be described: Body 13 provides a plurality of tubes 14, herein shown to be six in number, in spaced, side-by-side relation joined together by fins 15 spaced axially of the tubes. Disposed within respective intermediate tubes 14 are the previously mentioned elements 10 which are of a length somewhat greater than the tubes so as to project therebeyond. As herein shown, the end-most tubes 14 are empty to improve heat-dissipation of the assembly; however, if desired, heating elements may also be disposed therein or, alternatively, the sensing element of a thermostatic switch may be disposed in one of such tubes.

The manner in which elements 10 are maintained within the tubes 14 will later be described, attention next being directed to FIGURE 3 wherein a detail of the finned body 13 is shown. As presently disclosed, body 13 is formed of a plurality of strips of sheet metal in side-by-side relation forming respective fins 15. Each sheet metal strip presently has six tubular portions 16 preferably extruded therefrom as an integral part thereof to project from one strip side, such tubular portions being spaced from each other along the strip as shown. For a purpose to appear, each tubular strip portion 16 is tapered; i.e., its free end is smaller in diameter than is its end adjacent the strip from which it is formed.

In assembling the finned body 13, the required number of strips seen in FIGURE 3 are stacked one above the other with the tubular portions 16 in nested relation, see FIGURE 4, to form the previously described tubes 14. The taper of the tubular portions 16 is such that adjoining fins 15 will be spaced from each other as shown.

Following assembly of the strips as above described, a ceramic cap 17 will next be assembled with each of the lowermost tubular portions 16 which will contain an element 10 as seen in FIGURE 5. As herein shown, each cap 17 has a stepped recess formed therein, the mouth 18 of the recess being tapered complementary with and for closely receiving a respective lowermost tubular strip portion 16. Inward of the recess mouth 18, a recess portion 19 is provided which is slightly larger in diameter than is the exterior of the previously mentioned element sheath 11. Finally a recess portion 20 is provided which is slightly larger in diameter than is the element terminal pin 12. While it is contemplated that individual caps 17 will be employed, it will readily be apparent that a single ceramic member having appropriately positioned recesses could readily be substituted for such individual caps.

With the caps 17 positioned on the lower ends of those tubes 14 which are to receive a sheathed heating element, a molten predetermined quantity of a relatively low melting point, heat-conductive material 21, such as, for example, lead, will be disposed in each cap recess. A convenient way of disposing the proper quantity of material 21 in each cap is to simply disposed in each tube 14 a piece of the material, in rod form as shown in phantom at 22 in FIGURE 5, cut to a length representing the desired quantity. The assembly may then be subjected to sufficient heat, as by disposition in an oven, to melt the material 21.

With the material in molten form as seen in FIGURE 5, an element 10 will be lowered into each tube 14 until it bottoms in its respective cap recess as shown in FIGURE 6. Preferably, each element will have been heated to at least the melting point of the material 21 so as not to immediately chill the latter upon insertion of the element in the tube. As clearly illustrated in FIGURE 6, each element 10 has an outside diameter slightly less than the minimum inside diameter of a respective tube 14 to provide a slight radial clearance therebetween.

As a heated element 10 is inserted into its tube 14 containing the molten material 21, the latter will be displaced upwardly to fill the radial space between the element and the tube. If the proper quantity of molten material has been employed, the latter will rise to the top of the tube but will not spill over.

With the elements disposed in the tubes as above described, the assembly will be allowed to cool so as to solidify the material 21. Upon solidification of such material, the ceramic caps 17 may be removed, as by fragmenting them with a blow from a hammer, and the thin layer of material 21 clinging to the lower end of the element sheath 11, the lower terminal pin 12, and the lower end face of the element will be removed by wire brushing or other suitable means. With the solidified material 21 cleaned off the lower ends of the element 10, the element fin assembly is ready for use upon connection of power leads to respective element terminal pins 12.

While an assembly employing four elements in a single row has herein been disclosed, it will be apparent that a greater or lesser number of elements may be used and/or such elements may be arranged in more than one row or in any other suitable pattern.

In the embodiment of the invention fragmentarily seen in FIGURE 7 wherein corresponding parts carry the same reference characters as before but with the suffix "a" added, provision is made for but a single heating element by forming each fin 15a with but a single tapered tubular portion 16a. With a plurality of fins 15a stacked with their portions 16a in nested relation as hereinbefore described, a tube will be provided for receiving a heating element which will be integrated with the fins in the manner previously disclosed.

In view of the foregoing it will be apparent to those skilled in the art that I have accomplished at least the principal object of my invention and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim:

1. The method of making a finned electric heating element, comprising stacking a plurality of metallic heat conducting fins, each having a tapered tubular portion and a laterally extending fin portion, with the tubular portion of one fin fitting closely within the tubular portion of an adjoining fin to form an elongated tube, positioning an elongated metal-sheathed tubular electric heating element longitudinally of and within said tube with space between the outer peripheral surface of the sheath of said element and the inner peripheral surface of said tube, filling said space with heat-conducting material in a fluid state, and solidifying said material within said space to establish a heat-conductive bond between said peripheral surfaces.

2. The method of providing a sheathed electric resistance heating element with heat-dissipating fins, which comprises forming a tapered tubular portion in each of a plurality of heat-conductive fins, disposing said fins in spaced side-by-side relation with the tubular portions thereof in nested relation to form a continuous tube, closing one end of the tube thus formed, providing a predetermined volume of heat-conductive fluid material at the closed tube end, inserting said element into the tube aforesaid through its open end and displacing said fluid material with said element until such material fills the radial space between the tube interior and the element exterior, and solidifying said material in situ to provide a unitary assembly between said element and said fins.

3. The method of claim 2 which comprises closing said one tube end with a cap, and which further comprises removing said cap following solidification of said material to provide access to the adjoining element end.

4. The method of claim 3 wherein said cap is formed of frangible material and wherein said cap is removed by fragmentation.

5. The method of claim 2 wherein said fluid material at said closed tube end is provided by heating a predetermined volume of metal having a relatively low-temperature melting point until it becomes molten, and wherein said material is solidified by cooling.

6. The method of claim 5 and further comprising the step of heating said element to at least the melting point of the molten metal prior to displacement of the latter thereby.

7. The method of claim 6 wherein the low-temperature melting point metal is first deposited in said tube as an elongated solid body of a predetermined length prior to heating thereof.

8. The method of claim 7 which comprises closing said one tube end with a cap prior to heating of said low-temperature melting point metal, and which further comprises removing said cap following solidification of said material to provide access to the adjoining element end.

References Cited

UNITED STATES PATENTS

| | | | |
|---|---|---|---|
| 3,330,031 | 7/1967 | Rediger et al. | 164—109 X |
| 1,880,786 | 10/1932 | Carey | 164—109 |
| 1,896,501 | 2/1933 | Whitaker | 165—182 X |
| 1,896,502 | 2/1933 | Whitaker | 165—182 X |
| 1,902,350 | 3/1933 | Whitaker | 165—182 X |
| 1,925,967 | 9/1933 | Olson | 164—109 X |
| 2,051,930 | 8/1936 | Young et al. | 338—51 |
| 2,170,175 | 8/1939 | Wiegand | 219—540 |
| 2,602,650 | 7/1952 | Marcotte | 165—182 X |
| 2,996,773 | 8/1961 | Summers | 164—109 X |
| 3,222,737 | 12/1965 | Reuter. | |
| 3,292,689 | 12/1966 | Kimura | 12—66 |

FOREIGN PATENTS 510,221   12/1938   Great Britain.

JOHN F. CAMPBELL, Primary Examiner

J. L. CLINE, Assistant Examiner

U.S. Cl. X.R.

165—182